United States Patent [19]

Loewenthal

[11] 4,195,723
[45] Apr. 1, 1980

[54] CONVEYOR SYSTEM WITH ARTICLE SEPARATOR

[75] Inventor: Horst Loewenthal, Tiengen, Fed. Rep. of Germany

[73] Assignee: SIG - Schweizerische Industrie-Gesellschaft, Neuhausen am Rheinfall, Switzerland

[21] Appl. No.: 939,114

[22] Filed: Sep. 5, 1978

[30] Foreign Application Priority Data

Sep. 5, 1977 [CH] Switzerland ............ 10813/77

[51] Int. Cl.² ............................................. B65G 47/31
[52] U.S. Cl. ....................................... 198/461; 198/459
[58] Field of Search ................................ 198/459, 461

[56] References Cited

FOREIGN PATENT DOCUMENTS 378774  7/1964  Switzerland .
432372  9/1967  Switzerland .
489412  6/1970  Switzerland .
553709  9/1974  Switzerland .

Primary Examiner—Jeffery V. Nase
Attorney, Agent, or Firm—Spencer & Kaye

[57] ABSTRACT

A conveyor system includes a first conveyor for advancing serially arranged, contacting articles; a second conveyor adjoining the first conveyor and including article pusher members for advancing the articles individually or groupwise spaced from one another; a circulating article advancing device for separating individual articles or article groups from the article series on the first conveyor and transferring them from the first conveyor to the second conveyor. The motion of the circulating article advancing device is synchronized with the motion of the article pusher members of the second conveyor for effecting a take-over of the conveyance of the transferred articles by the article pusher members from the circulating article advancing device. The circulating article advancing device has article abutting members and article accelerating members arranged to engage simultaneously into a gap between a first article to be transferred and a second adjoining article contacting the first article. The article abutting members are driven with a speed corresponding at least approximately to that of the first conveyor, while the article accelerating members are driven with a speed greater than that of the article abutting members, so that the operative article abutting member withholds the second article from the first article and the operative article accelerating member transfers the first article to an article pusher member of the second conveyor.

7 Claims, 7 Drawing Figures

CONVEYOR SYSTEM WITH ARTICLE SEPARATOR

BACKGROUND OF THE INVENTION

This invention relates to an apparatus for separating articles which are conveyed on a first, input conveyor in an uninterrupted series and in an end-to-end contacting relationship and for transferring the articles onto a second, discharge conveyor which is provided with article pusher members and on which the articles or article groups are spaced at uniform distances. The articles are shaped in such a manner that between the end-to-end contacting articles, at least on one part of their upper faces, uniform gaps are provided. The apparatus further has a circulating article advancing device, the motion of which is synchronized with that of the second conveyor and which engages at least one incoming traveling article and introduces it into the discharge conveyor.

Apparatuses of the above-outlined type are known and are disclosed, for example, in Swiss Patents No. 378,774, 432,372 (to which corresponds U.S. Pat. No. 3,424,293), 489,412 (to which corresponds U.S. Pat. No. 3,572,495) and 553,709 (to which corresponds U.S. Pat. No. 4,006,813). In these known apparatuses the individual articles are either pushed laterally by a pusher from the input conveyor onto the offset discharge conveyor, or they are grasped by grippers and are transferred, with an increased speed, to the discharge conveyor. it is a disadvantage of these known apparatuses that structurally complex and expensive machine elements are necessary and that their maximum output is limited to approximately 250–300 articles per minute.

Further, apparatuses of the above-outlined type are known wherein the incoming article series is periodically arrested in order to separate the leading article or a leading article group from the rest of the series and to transfer the separated items to the discharge conveyor. The output of such apparatuses is even more limited and reaches only approximately 150–200 articles per minute.

The known apparatuses further have the disadvantage that the delicate articles are likely to be damaged and abraded as a result of the lateral push, braking or acceleration.

SUMMARY OF THE INVENTION

It is an object of the invention to provide an improved conveyor system of the above-outlined type to achieve the highest possible output with a continuously operating structure having a reduced number of components and further wherein the mutually contacting faces or edges of the articles are shifted with respect to one another to a lesser extent and thus operational disturbances caused by sticking of adjoining articles is avoided in a large measure.

This object and others to become apparent as the specification progresses, are accomplished by the invention, according to which, briefly stated, the conveyor system includes a first conveyor for advancing serially arranged, contacting articles; a second conveyor adjoining the downstream end of the first conveyor and including spaced article pusher members for advancing the articles individually or groupwise spaced from one another; a circulating article advancing device for separating individual articles or article groups from the article series on the first conveyor and transferring the individual articles or article groups from the first conveyor to the second conveyor. The motion of the circulating article advancing device is synchronized with the motion of the article pusher members of the second conveyor for effecting a take-over of the conveyance of the transferred articles by the article pusher members from the circulating article advancing device. The circulating article advancing device has article abutting members and article accelerating members arranged to engage into a gap between a first article to be transferred and a second adjoining article contacting the first article. The article abutting members are driven with a speed corresponding at least approximately to that of the first conveyor, while the article accelerating members are driven with a speed greater than that of the article abutting members. The motion of the circulating article advancing device is so synchronized that an article abutting member and an article accelerating member is introduced simultaneously into the same gap, whereby the article abutting member withholds the second article from the first article and the article accelerating member transfers the first article to an article pusher member of the second conveyor.

In a preferred embodiment of the invention, the circulating article advancing device is formed of two vaned wheels which rotate about a common axis and wherein one wheel has vanes serving as abutments and the other, more rapidly rotating wheel has vanes serving as an article accelerator.

Since at all times an abutment vane and an accelerator vane engage simultaneously into the gap between two articles, the relatively rapidly rotating accelerator vane accelerates the article which is located in front of it (that is, downstream of the accelerator vane as viewed in the direction of article feed), while the relatively slowly rotating abutment vane slows down the successive article relative to the article accelerated and thus prevents the successive article from remaining adhered to and being towed by the leading article.

The apparatus according to the invention is particularly adapted to the processing of cast chocolate bars which have a trapezoidal section. The apparatus, however, may also handle other articles between which a gap exists if they are in an end-to-end contacting relationship with one another.

DESCRIPTION OF THE PREFERRED EMBODIMENTS

Figure 1:
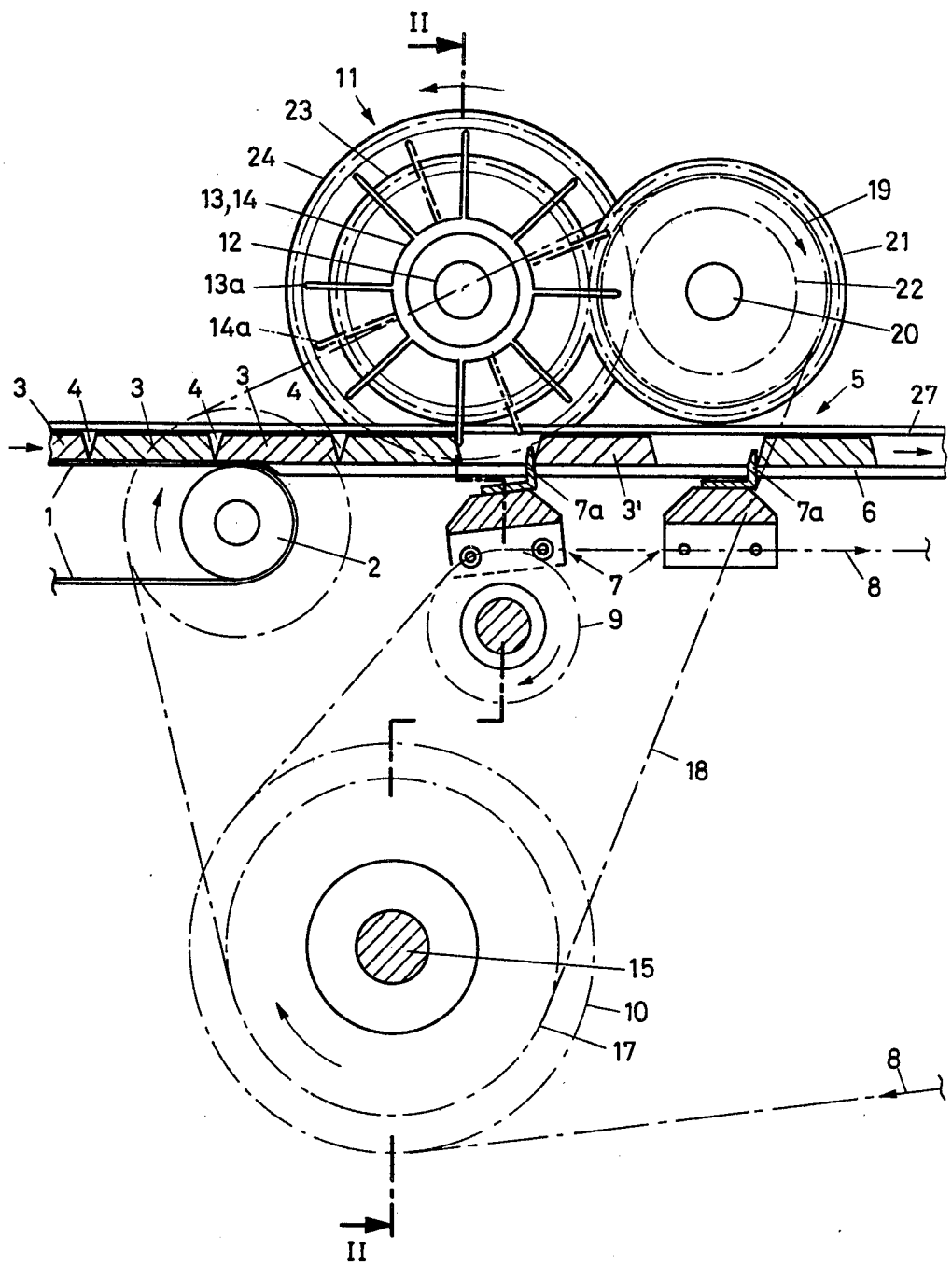
FIG. 1 is a sectional side elevational view of a preferred embodiment of the invention taken along line I—I of FIG. 2.

Turning now to FIG. 1, on an endless conveyor belt 1, of which only the downstream end with a deflecting roll 2 is shown, flat articles 3 such as chocolate bars are advanced in an uninterrupted series. The articles are in contact with one another with their leading and trailing edges. Since the lateral walls of the articles have an inclined orientation, between adjoining articles there is defined a gap 4. The articles 3 have to be separated from one another and transferred either individually or in uniform groups onto a discharge conveyor 5 including pushers 7 which project into a slide track 6 and which introduce the individual articles 3 or article groups at a fixed distance from the successive articles or article groups into a processing machine such as a packing machine. In the description that follows, reference will be made only to the illustrated embodiment in which articles 3 are individually transferred to the discharge conveyor 5.

The pusher members 7 are attached to a circulating endless chain 8 which is trained about deflecting sprockets such as 9 and 10. At the downstream (discharge) end of the conveyor belt 1 there is arranged the slide track 6 which has a central longitudinal slot 6a (as shown in FIG. 2) into which project the vertical abutments 7a of the pushers 7.

Above the upstream end of the slide track 6 there is arranged a circulating article advancing device 11 which has two vaned wheels 13 and 14 rotatably supported on a common shaft 12. The wheel 13 has eight radially outwardly extending vanes 13a which serve as abutment vanes for the articles 3. The wheel 14 has four radially outwardly extending vanes 14a which serve as accelerator vanes for the articles 3. The two wheels 13 and 14 are rotated with unlike rpm's, as will be described later in more detail. The vaned wheel 13 is driven with such an rpm that the outer ends of the vanes 13a rotate with a circumferential speed which at least approximately corresponds to the conveying speed of the articles 3 on the conveyor belt 1. The vaned wheel 14, on the other hand, is driven with twice the rpm of the wheel 13. As a result, each wheel rotates through an angle of one wheel division during identical periods.

Figure 2:
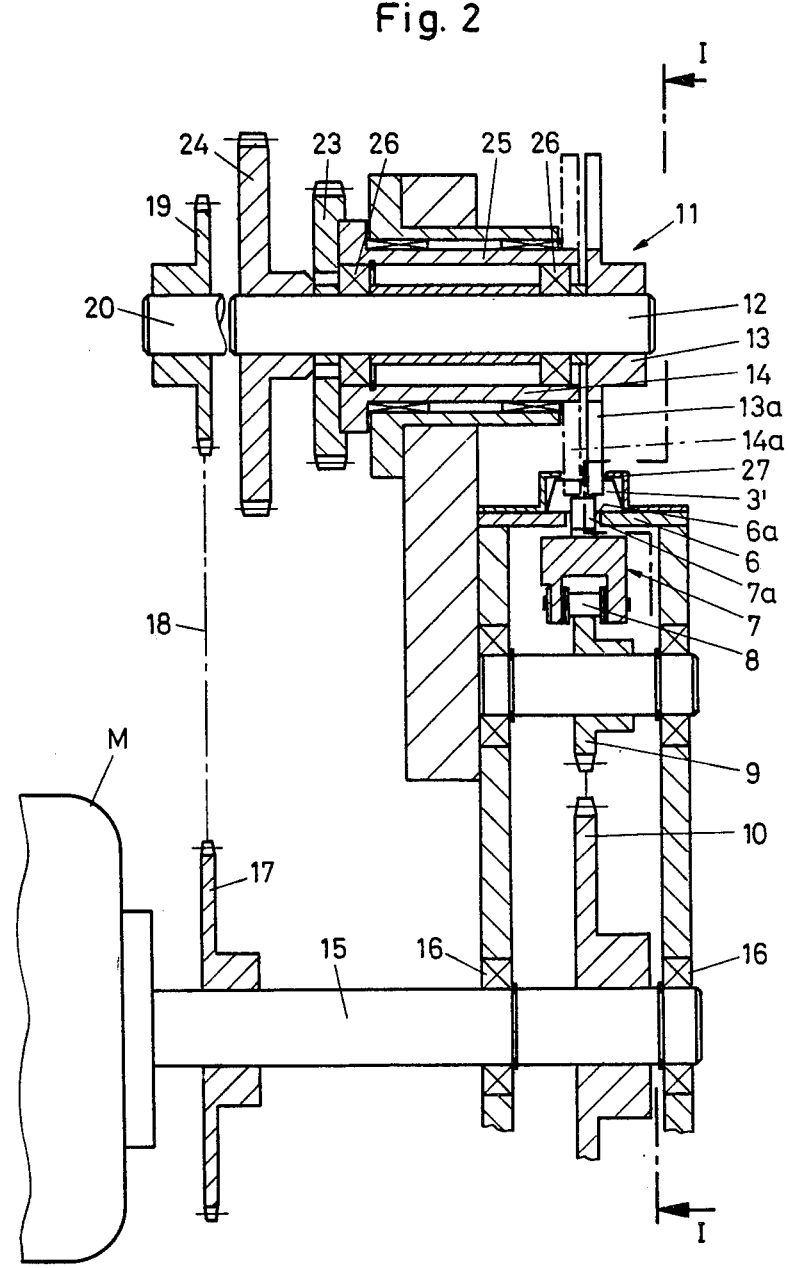
FIG. 2 is a sectional front elevational view taken along line II—II of FIG. 1.

The drive of the apparatus is illustrated in FIGS. 1 and 2. A motor M drives a shaft 15 which is supported in bearings 16. To the shaft 15 there are secured sprockets 17 and 10. The latter drives the chain 8 to which, in turn, there are secured the pusher members 7.

The sprocket 17 drives, by means of an endless chain 18, the sprocket 19 which is secured to a shaft 20. To the shaft 20, in turn, there are secured spur gears 21 and 22 which mesh with respective spur gears 23 and 24.

The spur gear 24 drives the vaned wheel 13 by means of the shaft 12, while the spur gear 23 drives the vaned wheel 14 with an rpm which is twice the magnitude of the rpm with which the wheel 13 is driven. The spur gear 23 drives the vaned wheel 14 with the intermediary of sleeve 25 which is supported by bearings 26.

The slide track 6 is, in the zone of the article advancing device 11, provided with upper guide members 27 which prevent the articles 3 from being lifted off the track 6. The guide members 27 may be elastically yielding leaf springs.

In the description which follows, the operation of the device will be described in conjunction with FIGS. 3 through 7.

Figure 3:
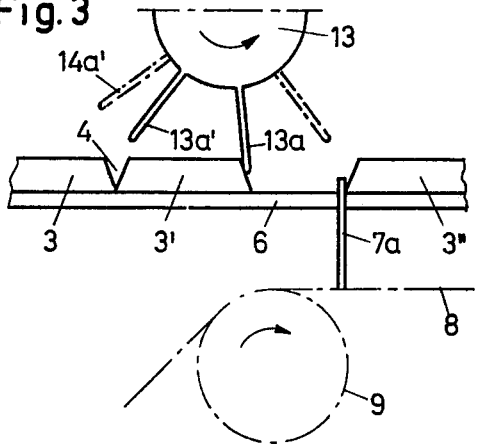
FIGS. 3 through 7 are schematic side elevational views of components shown in different operational positions.
Figure 4:
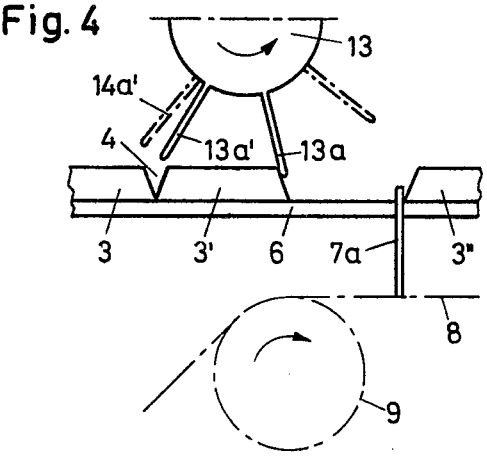
Figure 5:
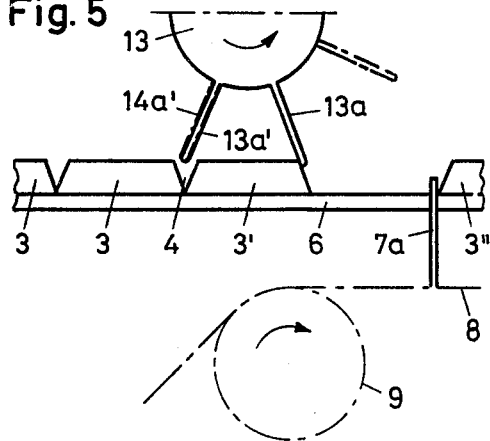
Figure 6:
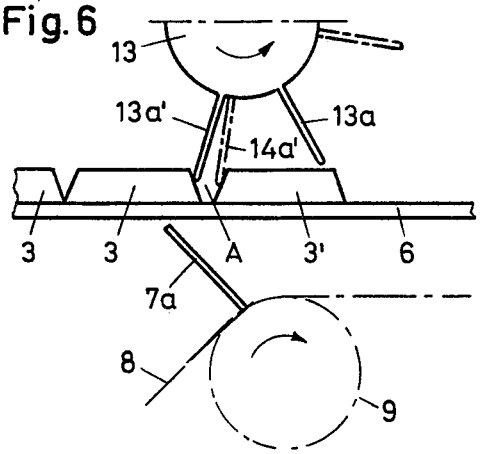
Figure 7:
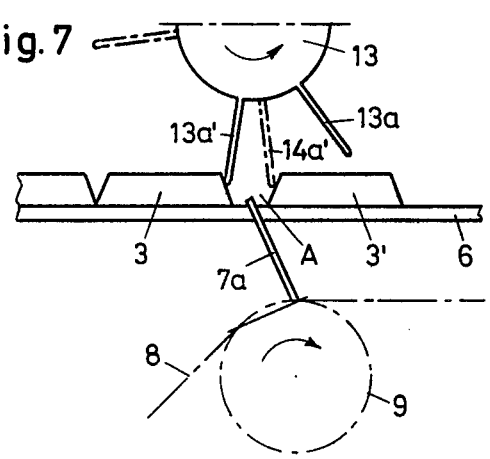

FIG. 3 depicts a moment with an article 3" has already been engaged by an abutment 7a, while the leading article 3' of the conveyed series on the slide track 6 is still being pushed by the article 3 behind it. The vanes 13a' and 14a' are still situated above the gap 4. In FIG. 4 the vanes 13a' and 14a' have approached the gap 4. At the same time, the more rapidly rotating accelerator vane 14a' has moved closer to the abutment vane 13a'. FIG. 5 illustrates the moment in which the two vanes 13a' and 14a' lie practically in a common plane extending transversely to the direction of conveyance and penetrate simultaneously into the gap 4. The accelerator vane 14a' thus accelerates the article 3', so that there is obtained a distance A between the articles 3 and 3' as illustrated in FIG. 6. The abutment vane 13a' is delayed, thus positively separating the article 3 from the article 3'. At the same time, the abutment 7a of the pusher member 7 approaches the clearance A and subsequently engages into the slide track 6 as shown in FIG. 7 and takes over further delivery of the article 3' as it is seen in FIG. 1.

It is to be understood that the invention is not limited to the above-described preferred embodiment. It is feasible to use vaned wheels 13 and 14 which have a different number of abutment vanes 13a and accelerator vanes 14a. It has to be ensured, however, that each wheel is rotated through an angle of one vane division at identical times and that the wheels are set and synchronized in such a manner that, at all times, one vane 13a and one vane 14a lie at least approximately in a common plane as they engage into a gap 4 between two successive articles 3 and 3'.

It is further feasible to provide an article advancing device which, instead of vaned wheels, has two circulating endless chains or belts on which the abutment and accelerator vanes are mounted.

Further, it is feasible to arrange the article advancing device 11 laterally of the slide track 6 rather than thereabove and rotate it about a vertical axis in case the articles to be conveyed have lateral gaps.

It is to be understood that the above description of the present invention is susceptible to various modifications, changes and adaptations, and the same are intended to be comprehended within the meaning and range of equivalents of the appended claims.

What is claimed is:

1. In a conveyor system including a first conveyor for advancing serially arranged, contacting articles; a second conveyor adjoining a downstream end of the first conveyor and including spaced article pusher means for advancing the articles individually or groupwise spaced from one another; a circulating article advancing device for separating individual articles or article groups from the article series on the first conveyor and transferring the individual articles or article groups from the first conveyor to the second conveyor; and means for synchronizing the motion of the circulating article advancing device with the motion of the article pusher means of the second conveyor for effecting a take-over of the conveyance of the transferred articles by the article pusher means from the circulating article advancing device; the improvement in said circulating article advancing device comprising
   (a) article abutting means arranged to engage into a gap between a first article to be transferred and a second adjoining article contacting the first article;
   (b) article accelerating means arranged to engage into said gap; and
   (c) drive means for driving said article abutting means with a speed corresponding at least approximately to that of said first conveyor and for driving said article accelerating means with a speed greater than that of said article abutting means; said drive means including synchronizing means for introducing said article abutting means and said article accelerating means simultaneously into the same gap, whereby the article abutting means withholds the second article from the first article and said article accelerating means transfers the first article to said article pusher means of said second conveyor.

2. A conveyor system as defined in claim 1, wherein said circulating article advancing device comprises a first and a second vaned wheel supported for rotation about a common axis; further wherein said article abutting means is constituted by a plurality of first vanes forming part of said first vaned wheel and said article accelerating means is constituted by a plurality of second vanes forming part of said second vaned wheel; and further wherein said drive means includes means for rotating said second vaned wheel with a higher rpm than said first vaned wheel.

3. A conveyor system as defined in claim 2, wherein said common axis is horizontal.

4. A conveyor system as defined in claim 2, wherein the number of said first vanes is greater than that of said second vanes.

5. A conveyor system as defined in claim 4, wherein said first and second vanes extend radially from the respective first and second vaned wheels in a uniform circumferential distribution; and further wherein the means for rotating the vaned wheels with unlike rpm's is so coordinated that the ratio of the rpm of the first vaned wheel to the rpm of the second vaned wheel equals the ratio of the numbers of vanes in the second vaned wheel to the numbers of vanes in the first vaned wheel, whereby the displacement of the first vaned wheel through an angle between adjoining first vanes has a duration identical to that of the displacement of the second vaned wheel through an angle between adjoining second vanes.

6. A conveyor system as defined in claim 2, wherein said second conveyor comprises a slide track adjoining said downstream end of said first conveyor and guide means disposed above said slide track in the zone of said circulating article advancing device for maintaining the articles on said slide track; and further wherein said common axis is horizontal and extends above said slide track.

7. A conveyor system as defined in claim 1, wherein said second conveyor comprises a slide track adjoining said downstream end of said first conveyor and guide means disposed above said slide track in the zone of said circulating article advancing device for maintaining the articles on said slide track.

* * * * *